United States Patent

[11] 3,604,509

[72] Inventor Norman H. Sachnik
1035 Columbia, Houston, Tex. 77008
[21] Appl. No. 824,868
[22] Filed May 15, 1969
[45] Patented Sept. 14, 1971

[54] AIRPLANE FOAM GENERATOR
3 Claims, 7 Drawing Figs.

[52] U.S. Cl. .......... 169/15, 239/171
[51] Int. Cl. .......... A62c 35/00
[50] Field of Search .......... 239/171, 1, 428.5, 310, 8, 419.5; 169/15, 2, 2 A; 244/136; 222/190

[56] References Cited

UNITED STATES PATENTS 2,173,568 9/1939 Streif .......... 239/171
2,772,061 11/1956 Sellers .......... 239/171 X
2,988,343 6/1961 Edwards et al. .......... 169/15 X

OTHER REFERENCES

Article Titled " Foam That Kills Weeds," by Charles E. Ball, published in the Farm Journal, page 26, Volume 92, Number 11, November, 1968.

*Primary Examiner*—M. Henson Wood, Jr.
*Assistant Examiner*—Edwin D. Grant
*Attorney*—Charles W. Coffee

ABSTRACT: A foamable liquid is sprayed into a tubular chamber where it is thoroughly mixed into an airstream and thus foamed. From there the foam is forced into a larger chamber where it is dispersed to fall upon agricultural crops. The trailing edge of the second chamber from which the foam is discharged is readily adjustable so that the size of the globules of foam discharged is readily adjustable.

INVENTOR:

NORMAN H. SACHNIK

BY:

Atty.

INVENTOR:
NORMAN H. SACHNIK
BY: [signature]
Atty.

AIRPLANE FOAM GENERATOR

CROSS-REFERENCE TO RELATED APPLICATIONS

The following applications have a common inventor, ownership and similar subject matter although no claim of priority is made at this time.

| SERIAL NO. | FILED |
|---|---|
| 561,740 | June 30, 1966 |
| 634,551 | Apr. 28, 1967 |

BACKGROUND OF THE INVENTION

1. Field of the Invention

This invention relates to dispersing agricultural chemicals and more particularly to dispersing foam from an airplane.

2. Description of the Prior Art

Today, many agricultural "chemicals" or life determinants are applied to crops. These agricultural chemicals may be insecticides, herbicides, fertilizers, trace minerals, hormones, fungicides, pesticides, soil sterilants, etc. In commerce these materials are commonly called agricultural chemicals. A more descriptive term would be "life determinant" because each of these materials has an effect or determination on life. I.e., the fertilizers promote plant life and the fungicides kill lower forms of plant life and the insecticides kill animal life while the herbicides very selectively kill certain higher forms of plant life. Therefore, each of these materials has definite determination upon some form of life; therefore, they may all be called "life determination," although in commerce they are generally known as agricultural chemicals. Often these chemicals are dispersed from an airplane. In present practice, these chemicals are generally dispersed either as a spray in a water solution or as a dust in dry form. Neither of these chemicals are generally dispersed either as a spray in a water solution or as a dust in dry form. Neither of these forms are entirely satisfactory.

There has been developed valves to be used upon spray rigs such as shown in WAHLIN, U.S. Pat. No. 2,639,194, so that the spray does not drip from the nozzle when the pressure is cut off.

Also, according to my previous inventions noted above, there is a distinct advantage of dispersing these chemicals in the form of foam. It is possible to obtain better visual control upon dispersion of the chemicals and, also, it is possible to get as even or more even distribution with less fluid carrier, reducing the amount of fluid which must be carried in the airplane. Since the capacity of the airplane is limited by the amount of carrier rather than the amount of active ingredient or life determinant constituent, if the ratio of active ingredient to carrier is doubled, it is possible in most cases to carry twice as much active ingredient on any one trip. Generally, the ratio of the carrier to the active ingredient is high.

SUMMARY OF THE INVENTION

I have invented a new foam generator particularly adapted to be carried on an airplane. In this particular disclosure, a foamable fluid containing the life determinant is dispersed from a nozzle in a fan-shaped jet into a stream of air which is flowing through a tube. The tube is designed to form a first chamber with a particular shape designed to cause turbulence, insuring a full mixing of the foamable fluid with the air so the foam is generated. From here the foam is discharged into a second chamber, which is generally of airfoil shape. From here the foam is discharged from the rear of the airfoil in such a way that it can be broken up into the size particles desired. The size of the particles in which the foam is broken up will depend not only upon the particular chemical being sprayed, but, also, where the particular foam generator or chamber is located along the wing of the airplane. It is well known that at the tip of the wing of an aircraft, there is much more turbulence than there is other places. Therefore, it is often desirable to discharge larger globules at the tip because of the turbulence which will spread them wider and the turbulence itself will tend to break the globules into smaller size.

An object of this invention is to distribute agricultural chemicals or life determinants upon crop land.

Other objects are to achieve the above with a device that is lightweight, sturdy, compact, durable, simple, safe, versatile, efficient, and reliable, yet inexpensive and easy to manufacture, install operate, and maintain.

Further objects are to achieve the above with a method that is safe, rapid, versatile, lightweight, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DETAILED DESCRIPTION OF THE PREFERRED EMBODIMENT

As the term is used herein, "life determinants" shall mean ingredients that are commonly called "agricultural chemicals" and the term is meant to include insecticides, herbicides, fungicides, pesticides, soil sterilants; fertilizer, Pat. minerals, Ser. No. all other like materials which are used or may be used commercially in agriculture. Specific examples of different agricultural chemicals or life determinants are given in my prior Pat. application Ser. No. 561,740, filed June 30, 1966.

Also as used herein, "foamable liquid" means any substance which when mixed with air will cause a foam. Such substances are well known and are commonly used in fire fighting and in aerosol containers for such use as shaving. Typically they contain surfactants and water as well as foaming agents which tend to give the foam body.

I prefer to use a surfactant which lowers the surface tension of the water inasmuch as it has beneficial effects at the time the foam contacts growing plants, as more fully explained in my prior Pat. application Ser. No. 561,740, filed June 30, 1966. Typical examples of mixtures used to obtain foam are noted in that patent application. Furthermore, it is apparent that the foaming agent, surfactant and other ingredients must be compatible with the life determinant used.

Figure 1:
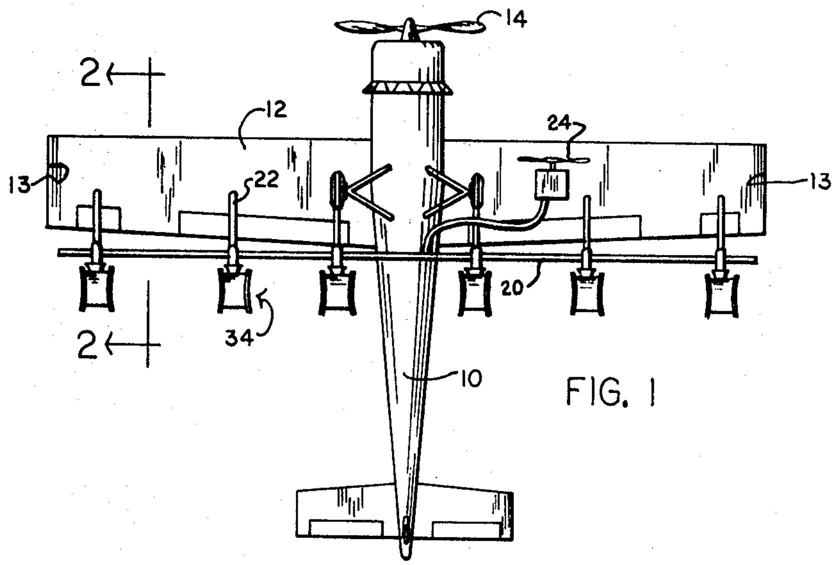
FIG. 1 is a bottom-plan view of an airplane with an embodiment of my invention attached thereto.
Figure 5:
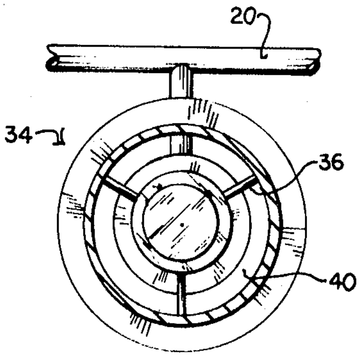
FIG. 5 is a sectional view of the generator taken on line 5—5 of FIG. 3.
Figure 2:
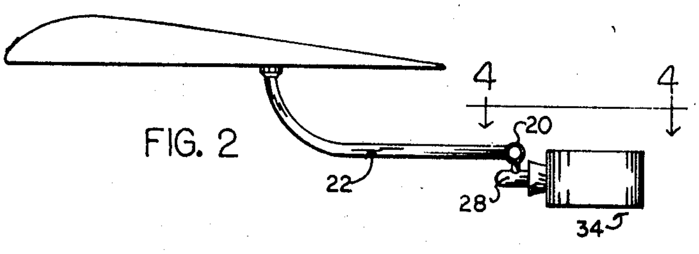
FIG. 2 is a cross section through one wing showing the foam generator taken substantially on line 2—2 of FIG. 1.
Figure 6:
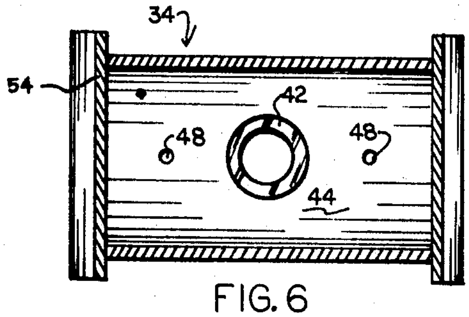
FIG. 6 is a sectional view taken on line 6—6 of FIG. 3.
Figure 7:
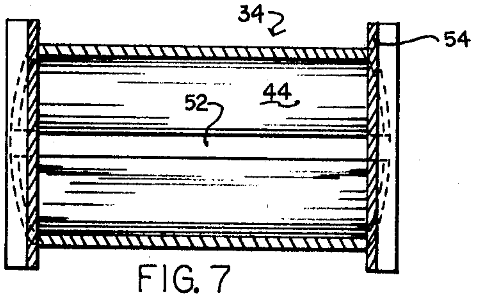
FIG. 7 is a sectional view taken on line 7—7 of FIG. 3.

Referring more particularly to FIGS. 1 and 2, the invention is particularly adapted to airplane 10. The airplane includes wings 12 and propeller 14. A vortex will result from each of the tips 13 of the wings 12. This vortex has two effects: one, it will tend to reduce the size of the foam globules in this area; two, it will carry globules dispersed near the tip 13 over a wider area than otherwise. Also, there will be a vortex resulting from the plane's propeller 14. These vortices and the creation of them are well understood to those skilled in the aeronautical arts and are important in the distribution of agricultural chemicals or life determinants from airplanes because it is necessary to adjust the amounts of materials distributed from each of the different points along the wings 12 and also the size of the particles distributed from each of the points along the wing as they might be involved in the tip vortex or the propeller vortex.

Figures 3, 4:
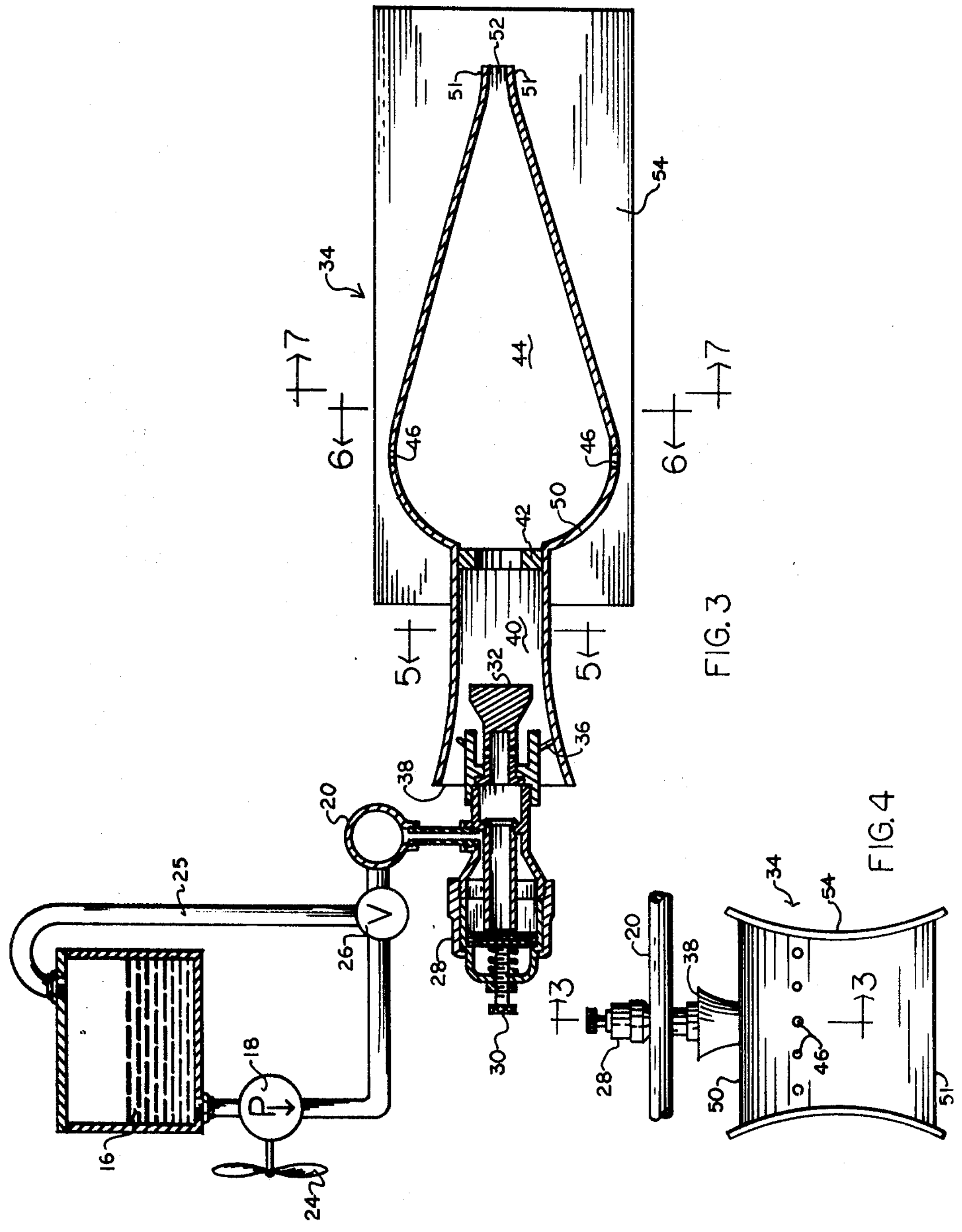
FIG. 3 is a sectional view of the generator taken on line 3—3 of FIG. 4.
FIG. 4 is a top-plan view of the generator as would be seen on line 4—4 of FIG. 2.

The airplane 10, in a customary manner, carries tank 16 containing a foamable liquid and the life determinants or agricultural chemicals. (Schematic FIG. 3.) From the tank 16, the chemicals are pumped through pump 18, thereby placing them under pressure in the supply boom 20. The supply boom is in the form of a pipe which is attached to the wing 12 by a plurality of struts 22. Although the pump 18 could be driven mechanically from the airplane engine, it has been illustrated as being wind driven by propeller 24. Constant pressure regulating valve 26 is combined with a manual cutoff valve so that the pilot of the airplane 10 may turn on and off the flow of the foamable liquid from the pump 18 to the boom 20. Relief line 25 returns excess liquid from the valve 26 to the tank 16.

A plurality of nondrip spray nozzles 28 are fluidly and structurally connected to the boom 20. Spray nozzles 28 perform three functions. First: by the use of adjustment screw 30, they regulate the rate of foamable fluid flow through the nozzle. Second: the nozzles have either a pressure flow through them or they are shut off without drip. Third: the nozzles spray the foamable liquid into an airstream. Spray nozzles of this type are well understood, i.e., WAHLIN, U.S. Pat. No. 2,639,194 shows one without the screw 30. The nozzle 28 has a distinctive spray distributor 32 to obtain a fan-shaped or conic-shaped distribution of the liquid throughout the airstream so that there is a good distribution of the foamable liquid with the air.

Foam chamber or generator 34 is attached by spider 36 to the spray nozzle 28. The foam generator has a front tubular section 40 which has mouth 38 which is facing the front of the airplane so that the mouth being flared out acts as an airscoop to create an airstream into the foam generator 34. The front portion or front tubular section 40 of the foam generator will have a venturi effect creating an area of high air velocity and low pressure at the point the foamable liquid is distributed by the distributor 32 into the airstream.

Interior flange 42 is located in the section 40 to the rear of the distributor 32. The flange 42 disrupts the smooth flow of the air causing a condition of extreme turbulence and high pressure between the distributor 32 and the flange 42. In this portion of the tubular front section 40 there is a turbulent area or mixing chamber where the liquid and the air are thoroughly and completely mixed together thus creating foam.

After the foam has been thoroughly created and mixed within the foaming area or section 40, the foam passes through the flange 42 into the distribution section or second section 44 of the foam generator 34. The distribution section 44 is an airfoil section having a convex exterior, both on top and bottom. As is well known in aeronautical arts, this will cause a low pressure area on the top and bottom section 44. I have placed small holes or perforations 46 at this low pressure area. Because of the small size of the perforations and the high wind velocity, very fine globules of foam will be dispersed from this area. Also, I have placed cleanout holes 48 in the leading edge 50 of the airfoil section 44. When the foaming liquid valve 26 is turned off and the liquid ceased to be sprayed into the foam chamber, the incoming air through the cleanout holes 48 quickly will blow all foam in the distribution section 44 of the foam chamber 34 out, cleaning it completely.

The rear or trailing edge 51 of the section 44 has open slot or distributing nozzle 52 across the entire width thereof. The major portion of the foam within section 44 will be discharged through this slot 52 can be enlarged or reduced. Also, the trailing edge of the upper and lower portion can both be bent down, causing an area of turbulence which will greatly tend to break up the globules of foam. Thus I have provided a large degree of adjustment for the globule size of foam discharged from the nozzle or slot 52. Also, the globule size may be adjusted by changing the attitude or relationship of the entire foam generator 34 to the air stream. Bending the connection of the spray nozzle 28 to the boom 20 will change the relationship of the air stream passing over the airfoil 44 and therefore, will greatly affect the size of globules distributed from slot 52. Furthermore, the perforations 46 may be closed as by solder, leaving all the foam to be distributed from the rear trailing nozzle 52, which, generally, will result in a larger globule size.

As explained above, foam chambers 34 set in the tip vortex and in the propeller vortex would be adjusted to distribute a larger globule size than those in the midsection of the wing in relatively clear air. Also, the foam generator 34 in the tip vortex would be adjusted to have more fluid distributed to them so that they distribute more active ingredients since the vortex will tend to distribute the life determinants over a wider area from these points.

Vertical stabilizers 54 are placed on either side of the airfoil section 44. These also flare out in front and back, thereby creating a venturi effect and said in the distribution pattern of the foam.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A foam generator comprising
   a. tubular chamber,
   b. means for creating an airstream through said tubular chamber,
   c. said chamber being open on two opposite ends,
   d. a spray nozzle attached to the chamber at one of said openings to said tubular chamber,
   e. said opening containing the spray nozzle being designated the mouth,
   f. a source of foamable liquid under pressure
   h. means called dispersing nozzle on the other opening for dispersing foam so generated within the chamber,
   j. means between the front and rear of the chamber for creating turbulence, thereby causing foam,
   k. said dispersing nozzle being adjustable in configuration to regulate the size of globules of foam dispersed therefrom.

2. The invention as defined in claim 7, with the additional limitations of
   o. means for adjusting the rate of flow of foamable liquid to the spray nozzle.

3. A foam generator comprising
   a. a tubular chamber,
   b. means for creating an airstream through said tubular chamber,
   c. said chamber being open on two opposite ends,
   d. a spray nozzle attached to the chamber at one of said openings to said tubular chamber,
   e. said opening containing the spray nozzle being designated the mouth,
   f. a source of foamable liquid under pressure
   g. fluidly connected to said spray nozzle,
   h. means called dispersing nozzle on the other opening for dispersing foam so generated within the chamber,
   j. means between the front and rear of the chamber for creating turbulence, thereby causing foam,
   k. said dispersing nozzle being adjustable to regulate the size of globules of foam dispersed therefrom and
   m. said means for creating turbulence being an interior flange.